(12) United States Patent
Wood

(10) Patent No.: US 7,216,831 B2
(45) Date of Patent: May 15, 2007

(54) SHAPE CHANGING STRUCTURE

(75) Inventor: Jeffrey H Wood, Eureka, MO (US)

(73) Assignee: The Boeing Company, Chicago, IL (US)

( * ) Notice: Subject to any disclaimer, the term of this patent is extended or adjusted under 35 U.S.C. 154(b) by 6 days.

(21) Appl. No.: 10/988,292

(22) Filed: Nov. 12, 2004

(65) Prior Publication Data
US 2006/0124801 A1 Jun. 15, 2006

(51) Int. Cl.
B64C 13/00 (2006.01)

(52) U.S. Cl. ................................... 244/99.8

(58) Field of Classification Search .............. 244/99.8, 244/39, 198, 213, 215, 76 J, 232, 99.14, 99.2, 244/126, 131, 133, 134 A
See application file for complete search history.

(56) References Cited

U.S. PATENT DOCUMENTS

| | | | | |
|---|---|---|---|---|
| 2,076,059 A | * | 4/1937 | Asbury | 244/218 |
| 2,249,729 A | * | 7/1941 | Fitzurka | 244/218 |
| 3,836,099 A | | 9/1974 | O'Neill et al. | |
| 4,559,512 A | * | 12/1985 | Yaeger et al. | 337/140 |
| 4,811,564 A | * | 3/1989 | Palmer | 60/527 |
| 4,830,315 A | * | 5/1989 | Presz et al. | 244/200 |
| 4,845,357 A | * | 7/1989 | Brennan | 250/227.14 |
| 5,114,104 A | * | 5/1992 | Cincotta et al. | 244/219 |
| 5,150,864 A | * | 9/1992 | Roglin et al. | 244/219 |
| 5,186,420 A | * | 2/1993 | Beauchamp et al. | 244/219 |
| 5,261,227 A | | 11/1993 | Giffin, III | |
| 5,366,176 A | * | 11/1994 | Loewy et al. | 244/99.8 |
| 5,419,788 A | * | 5/1995 | Thoma et al. | 148/402 |
| 5,460,132 A | * | 10/1995 | Ishiwata et al. | 123/364 |
| 5,529,458 A | * | 6/1996 | Humpherson | 416/20 R |
| 5,558,304 A | * | 9/1996 | Adams | 244/134 A |
| 5,626,312 A | * | 5/1997 | Head | 244/99.8 |
| 5,752,672 A | * | 5/1998 | McKillip, Jr. | 244/99.8 |
| 5,804,276 A | | 9/1998 | Jacobs et al. | |
| 5,934,609 A | * | 8/1999 | Kuklinski | 244/51 |

(Continued)

FOREIGN PATENT DOCUMENTS

EP 1 130 243 3/2001

(Continued)

OTHER PUBLICATIONS

Shape Memory Alloys—Frequently Asked Questions, www.azom.com, pp. 1-3.*

(Continued)

*Primary Examiner*—Teri Pham Luu
*Assistant Examiner*—Stephen A. Holzen
(74) *Attorney, Agent, or Firm*—Harness, Dickey & Pierce, P.L.C.

(57) ABSTRACT

In one preferred embodiment, a structure is provided that includes a body having a first wall and a second wall. At least one appending component extends from an end of the body and includes a first skin and second skin. The structure additionally includes at least one actuator positioned within a cavity formed in the body first wall and the appending component second skin. The actuator includes at least one shape memory alloy (SMA) wire adapted to constrict when activated to move the first skin of the appending component from a first position to a second position.

17 Claims, 6 Drawing Sheets

U.S. PATENT DOCUMENTS

| | | | | |
|---|---|---|---|---|
| 5,944,285 | A * | 8/1999 | Royer et al. | 244/129.4 |
| 6,009,669 | A | 1/2000 | Jardine et al. | |
| 6,062,315 | A * | 5/2000 | Reinhardt | 166/381 |
| 6,108,978 | A | 8/2000 | Jeong | |
| 6,131,853 | A * | 10/2000 | Bauer et al. | 244/113 |
| 6,209,824 | B1 * | 4/2001 | Caton et al. | 244/213 |
| 6,216,779 | B1 * | 4/2001 | Reinhardt | 166/57 |
| 6,220,550 | B1 * | 4/2001 | McKillip, Jr. | 244/215 |
| 6,318,070 | B1 * | 11/2001 | Rey et al. | 60/226.3 |
| 6,345,792 | B2 * | 2/2002 | Bilanin et al. | 244/215 |
| 6,349,903 | B2 * | 2/2002 | Caton et al. | 244/213 |
| 6,499,952 | B1 | 12/2002 | Jacot et al. | |
| 6,588,709 | B1 * | 7/2003 | Dunne et al. | 244/201 |
| 6,655,218 | B1 | 12/2003 | Ogisu et al. | |
| 6,684,904 | B2 * | 2/2004 | Ito | 137/530 |
| 6,718,752 | B2 | 4/2004 | Nesbitt et al. | |
| 6,735,936 | B2 * | 5/2004 | Rey et al. | 60/226.3 |
| 6,834,835 | B1 * | 12/2004 | Knowles et al. | 244/198 |
| 7,000,378 | B2 * | 2/2006 | Birch et al. | 60/226.1 |
| 7,004,047 | B2 * | 2/2006 | Rey et al. | 74/469 |
| 2001/0006207 | A1 * | 7/2001 | Caton et al. | 244/213 |
| 2001/0010348 | A1 * | 8/2001 | Bilanin et al. | 244/215 |
| 2001/0017335 | A1 * | 8/2001 | Kutlucinar | 244/102 R |
| 2002/0073691 | A1 * | 6/2002 | Rey et al. | 60/226.1 |
| 2002/0125340 | A1 | 9/2002 | Birch et al. | |
| 2003/0005926 | A1 * | 1/2003 | Jones et al. | 128/200.23 |
| 2003/0079625 | A1 * | 5/2003 | O'Hara et al. | 101/59 |
| 2004/0256920 | A1 * | 12/2004 | Gummin et al. | 310/15 |
| 2005/0001367 | A1 * | 1/2005 | Taya et al. | 267/166 |
| 2005/0121946 | A1 * | 6/2005 | McKnight et al. | 296/180.1 |
| 2005/0146076 | A1 * | 7/2005 | Alexander et al. | 264/257 |
| 2005/0230546 | A1 * | 10/2005 | Mc Knight et al. | 244/124 |
| 2005/0274103 | A1 * | 12/2005 | Prasad et al. | 60/226.1 |
| 2006/0027703 | A1 * | 2/2006 | Bussom et al. | 244/17.13 |
| 2006/0044093 | A1 * | 3/2006 | Ohta et al. | 335/220 |
| 2006/0049302 | A1 * | 3/2006 | Kennedy et al. | 244/17.11 |
| 2006/0052664 | A1 * | 3/2006 | Julian et al. | 600/146 |
| 2006/0056997 | A1 * | 3/2006 | Shapiro et al. | 417/412 |
| 2006/0070775 | A1 * | 4/2006 | Anhalt et al. | 180/9.1 |

FOREIGN PATENT DOCUMENTS

| | | |
|---|---|---|
| GB | 750307 | 6/1956 |
| JP | 07-237599 | 9/1995 |

OTHER PUBLICATIONS

"Shape memory alloy." Wikipedia, The Free Encyclopedia. Mar. 26, 2006, 22:04 UTC. Apr. 11, 2006, 20:40 <http://en.wikipedia.org/w/index.php?title=Shape_memory_alloy&oldid=45614825>.*

"Subsonic Jet Noise Reduction Variable Geometry Chevron," F. T. Calkins and G. W. Butler, Jan. 3-8, 2004, pp. 1-12.

"Morphing Chevrons for Take Off and Cruise Noise Reduction," James H. Mabe, Robert T. Ruggert, G. W. Butler, Scott Sellmeyer, Sep. 20-22, 2004, pp. 1-12.

* cited by examiner

SHAPE CHANGING STRUCTURE

FIELD OF INVENTION

The present invention relates to structures that are adapted to change shape or position for operational purposes. More particularly, the present invention relates to structures configured to alter shape or position without the use of electric or hydraulic actuators to pivotally rotate hinged components.

BACKGROUND OF THE INVENTION

There is a growing desire in the design of various structures to have structures that can change shape or position without the use of bulky mechanical devices. For example, in mobile platform design, e.g. aircraft, automobiles, trains and ships, to have structures that can change shape or position while the mobile platform is in operation. Such shape or positional changes are often desirable to meet fluctuating aerodynamic needs throughout the duration of the mobile platform's travel. Typically, such dynamic shaping is performed through specific control structures such as flaps, spoilers, ailerons, elevators, rudders, etc. These structures are normally rigid structures that are hinged and pivotally actuated utilizing complex kinematic mechanisms driven by bulky electric or hydraulic actuators. Typically, such kinematic mechanisms and actuators are located either on an exterior surface of the structure or within internal cavities of the structure.

However, it is often desirable to dynamically alter the shape or position of structures that can not internally or externally accommodate such kinematic mechanisms and the actuators that drive them. For example, with present day jet aircraft, structures typically known in the industry as "chevrons" have been used to help in suppressing noise generated by a jet engine. The chevrons have traditionally been fixed (i.e., immovable), triangular, tab-like elements disposed along a trailing edge of a jet engine bypass and/or core nacelles such that they project into, and interact with, the exiting flow streams. Although the chevrons have been shown useful to attenuate noise, since they interact directly with the flow streams generated by the engine, the chevrons also generate drag and loss of thrust. Consequently, it would be desirable to have the chevrons deploy into the flow streams when noise reduction is a concern and then return or move to a non-deployed position when reduction of drag is a concern. However, due to the aerodynamics necessities and extreme operational conditions associated with the engine nacelle and chevrons, kinematic mechanisms and the related actuators that would be needed to deploy the chevrons can not be located on external surfaces of the nacelle and chevrons. Furthermore, neither the nacelle structure nor the chevron structures provide adequate internal space to accommodate such kinematic mechanisms and actuators.

Thus, there exists a need for a system and method for dynamically altering the shape or position of structures, such as mobile platform control structures, without complex kinematic mechanisms or the use of bulky actuators.

BRIEF SUMMARY OF THE INVENTION

The above limitations are overcome by a system and method for dynamically altering the shape or position of a structure without complex kinematic mechanisms or the use of bulky actuators, in accordance with preferred embodiments of the present invention.

In one preferred embodiment, a structure is provided that includes a body having a first wall and a second wall. At least one appending component extends from an end of the body and includes a first skin and second skin. The structure additionally includes at least one actuator positioned within a cavity formed in the body first wall and the appending component second skin. The actuator includes at least one shape memory alloy (SMA) wire adapted to constrict when activated to move the first skin of the appending component from a first position to a second position.

In another preferred embodiment, a jet engine is provided that is adapted to controllably alter a flow stream emitted from a nacelle of the jet engine. The engine includes a nacelle nozzle having a body that includes an inner wall and an outer wall. A plurality of flow altering structures extend from an end of the nozzle body. Each flow altering structure includes an inner skin fixedly coupled at a proximal end to an edge portion of the nozzle body inner wall, and an outer skin fixedly coupled at a proximal end to an edge portion of the nozzle body outer wall. A distal end of the inner skin is in firm contact with, but not connected to, a distal end of the outer skin. A plurality of actuators are positioned within a plurality of cavities formed in the nozzle body outer wall and the outer skins of the flow altering structures. Each flow altering structure outer skin forms a first portion of one of the cavities and has at least one of the actuators connected thereto, within the respective cavity.

Each actuator includes a fixed pulling bracket coupled to an interior side of the nozzle body inner wall between the nozzle body inner and outer walls and within the cavity. Additionally, each actuator includes a free pulling bracket located between the nozzle body inner and outer walls and within the cavity. The free pulling bracket is free standing and movable within the cavity. Furthermore, each actuator includes a control arm connected at a first end to the free pulling bracket and at a second end to a deployment cam linkage that is connected to the outer skin of the respective flow altering structure. Further yet, each actuator includes a plurality of shape memory alloy (SMA) tendons coupled at a first end to the fixed pulling bracket and coupled at a second end to the free pulling bracket. When activated, the SMA tendons are adapted to one-dimensionally constrict along a longitudinal center line of each respective SMA cable. The constriction pulls the free pulling bracket and the control arm toward the fixed pulling bracket. This causes a lever plate of the deployment cam linkage to force the distal end of the appending structure inner skin apart from the distal end of the appending structure outer skin and move the appending structure inner skin from a first position to a second position.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention. Furthermore, the features, functions, and advantages of the present invention can be achieved independently in various embodiments of the present invention or may be combined in yet other embodiments.

BRIEF DESCRIPTION OF THE DRAWINGS

The present invention will become more fully understood from the detailed description and accompanying drawings, wherein.

Corresponding reference numerals indicate corresponding parts throughout the several views of drawings.

DETAILED DESCRIPTION OF THE INVENTION

The following description of the preferred embodiments is merely exemplary in nature and is in no way intended to limit the invention, its application or uses. Additionally, the advantages provided by the preferred embodiments, as described below, are exemplary in nature and not all preferred embodiments provide the same advantages or the same degree of advantages.

Figure 1:
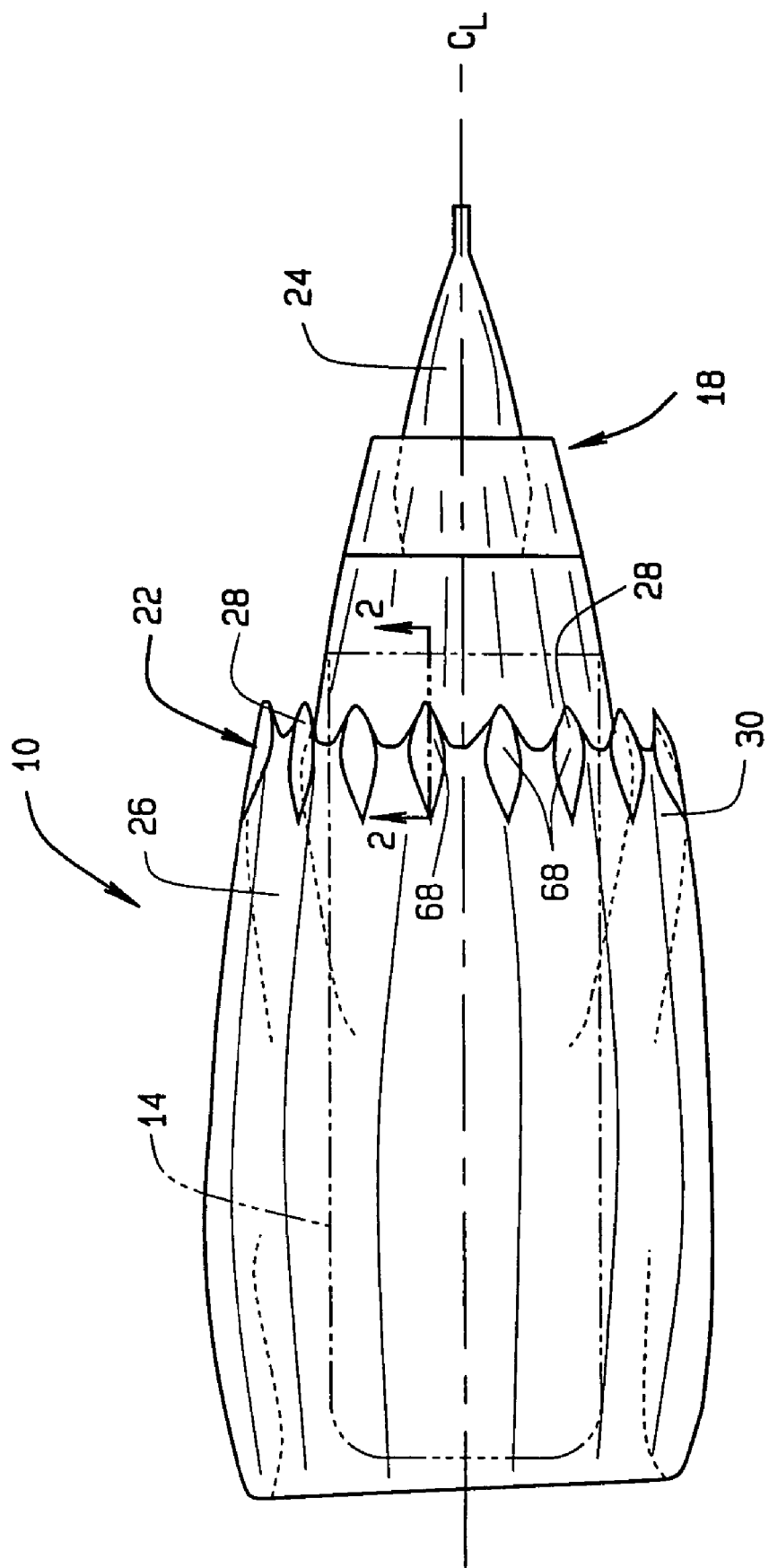
FIG. 1 is a simplified side view of a nacelle for housing a jet engine of an aircraft, with the nacelle incorporating a plurality of appending structures of the present invention along a trailing circumferential lip portion of a secondary flow nozzle of the nacelle.

FIG. 1, illustrates an exemplary structure 10, shown as a jet engine nacelle, in accordance with a preferred embodiment of the present invention. Although the structure 10 and associated features and components will be described herein with respect to a jet engine nacelle, it should be understood that the present invention is applicable to any structure configured to change shape, form or position, and that the specific references herein to the jet engine nacelle are merely exemplary. For example, the present invention could be applicable to environmental control system air flow structures, automotive fuel and drive chain structures, or control structures for mobile platforms, e.g. flaps, spoilers, ailerons, elevators and rudders.

The nacelle 10 houses a jet engine 14 and includes a primary flow nozzle 18, also referred to in the art as a core exhaust nozzle. The primary flow nozzle 18 channels an exhaust flow from a turbine (not shown) of the engine 14 out the aft end of the nacelle 10. The nacelle 10 additionally includes a secondary flow nozzle 22, also referred to in the art as a bypass fan exhaust nozzle, that directs the exhaust flow from an engine bypass fan (not shown) out of the aft end of the nacelle 10. A plug 24 is disposed within the nacelle 10. In a preferred embodiment, the secondary flow nozzle 22 includes a main body 26 and a plurality of appending structures 28. The appending structures 28 extend from a circumferential lip area 30, i.e. end portion, of the main body 26. The appending structures 28, commonly referred to in the art as "chevrons", are deployable to extend into an exhaust flow emitted from the secondary flow nozzle 22, i.e. by-pass fan exhaust flow, to alter the exhaust flow. Therefore, the appending structures 28 may also be referred to herein as exhaust mixing structures and/or flow altering structures. By altering the exhaust flow, the appending structures 28 create an intermixing of the exhaust flow with the ambient air flowing adjacent the nacelle 10 and the appending structures 28. The intermixing of the exhaust flow and the ambient air flow attenuates the noise generated by the engine 14.

Figure 2:
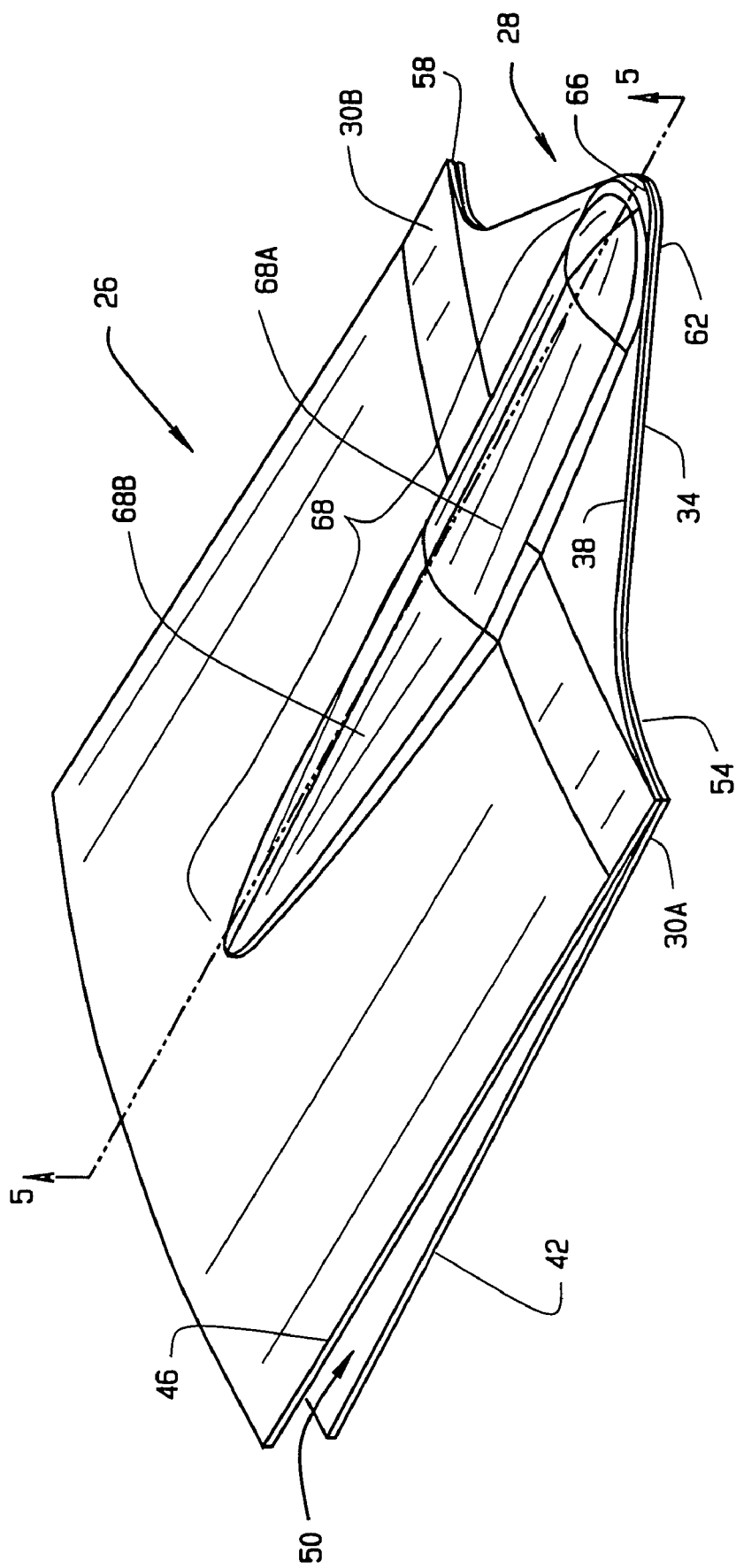
FIG. 2 is an isometric view of a portion of a main body of the nacelle secondary nozzle shown in FIG. 1, having one of the plurality of appending structures attached to the lip portion, in accordance with a preferred embodiment of the present invention.

Referring to FIG. 2, a portion of the nacelle secondary flow nozzle body 26 is illustrated having one of the appending structures 28 attached to the lip area 30 of the nacelle secondary flow nozzle body 26. More specifically, each appending structure 28 includes an inner skin 34 and an outer skin 38, more clearly shown in FIGS. 3 and 5. Preferably, the appending structure outer skin is constructed of any metallic or composite material suitable for the construction of jet engine nacelles, such as aluminum or carbon fiber. The secondary flow nozzle main body 26 includes an inner wall 42 and an outer wall 46 separated by cavity or gap 50. A proximal end 54 of the appending structure inner skin 34 is fixedly coupled to the lip portion 30A of the inner body wall 42. A proximal end 58 of the appending structure outer skin 38 is fixedly coupled to a lip portion 30B of the body outer wall 46. In a preferred embodiment, that appending structure inner skin 34 is integrally formed with the body inner wall 42 and the appending structure outer skin 38 is integrally formed with the body outer wall 46. When the inner skin 34 is in a non-deployed position, a distal end portion 62 of the appending structure inner skin 34 is in contact with, but not joined to, a distal end portion 66 of the appending structure outer skin 38.

The appending structure outer skin 38 includes a first portion 68A of a domed actuator housing 68 located along a longitudinal center portion of the outer skin 38. The secondary nozzle outer wall 46 includes a second portion 68B of the domed actuator housing 68 that mates with and is joined to the first portion 68A of the actuator housing 68. Thus, the actuator housing 68 extends along the body outer wall 46 and the appending structure outer skin 38 substantially parallel with a centerline of the nacelle 10, shown in FIG. 1. As described in detail below, the domed actuator housing 68 provides a cavity 70 for housing at least one actuator 72, shown in FIGS. 3–5.

Figure 3:
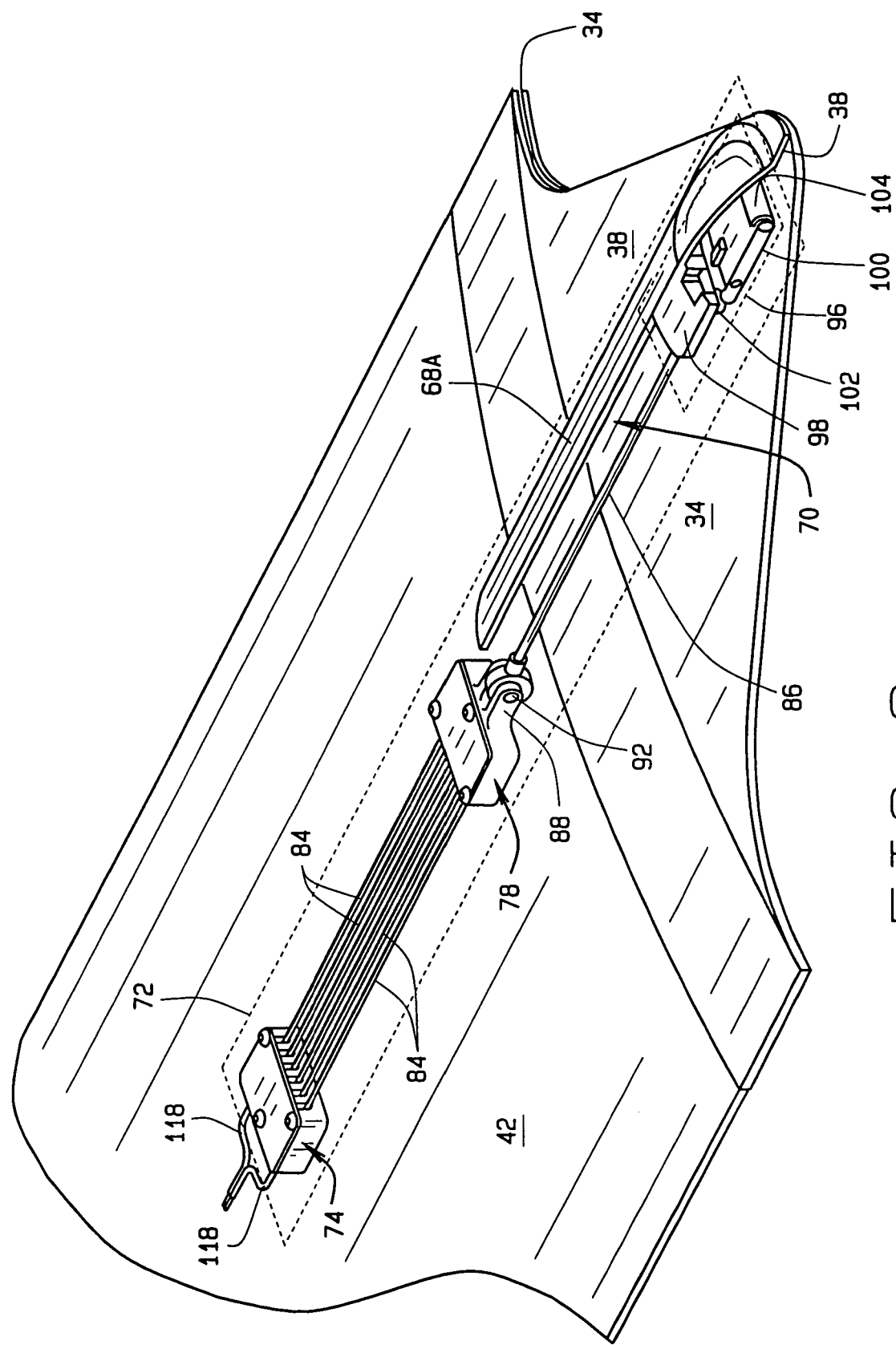
FIG. 3 is an isometric view of one of the plurality of appending structures shown in FIG. 1, having a section of an outer skin cut away to illustrate at least one actuator, in accordance with a preferred embodiment of the present invention.
Figure 4:
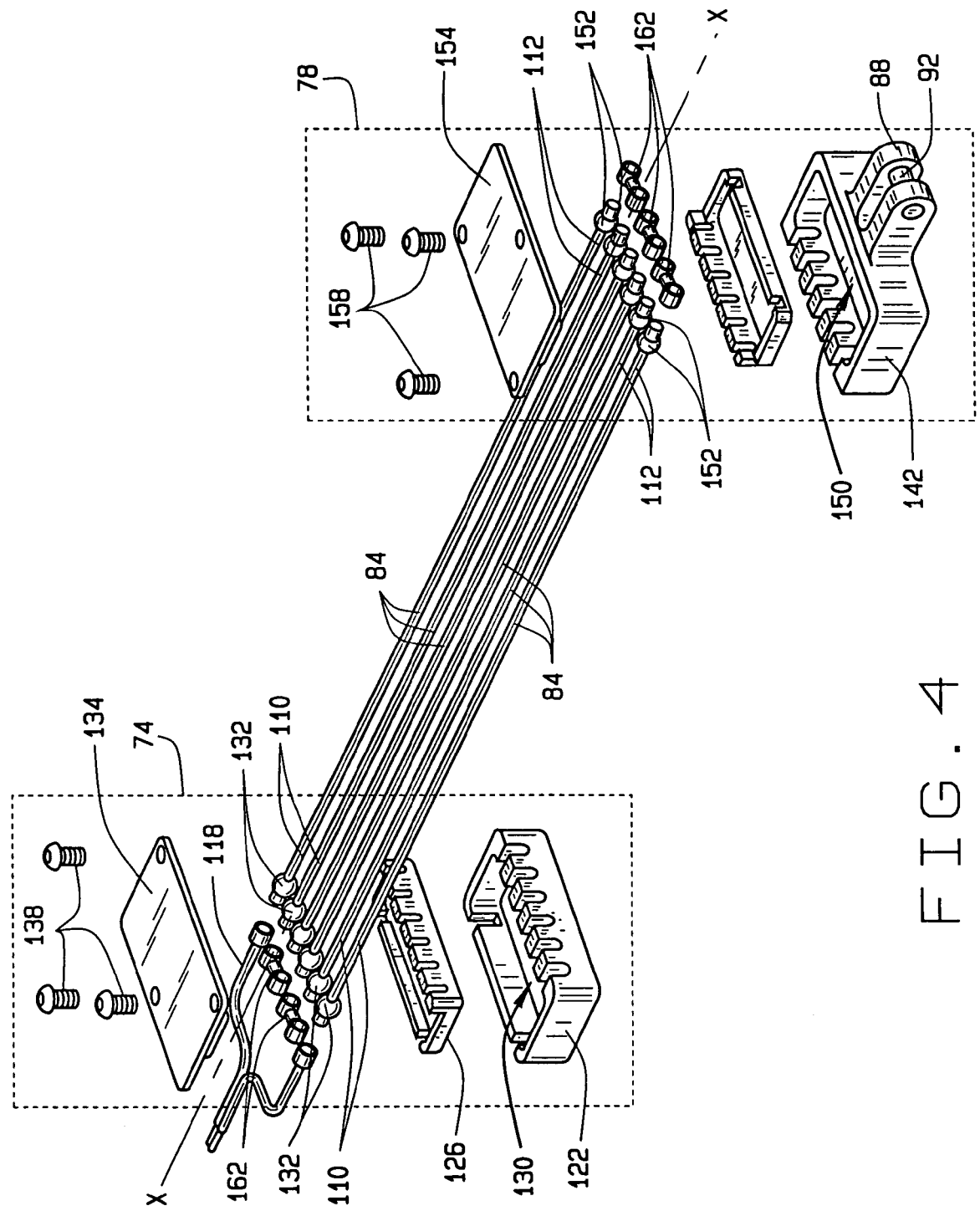
FIG. 4 is an exploded isometric view of a portion of the actuator shown in FIG. 3.

Referring now to FIGS. 3 and 4, the actuator 72 is located within the gap 50 and the cavity 70 and is attached to the main body 26 of the secondary flow nozzle 22. Each appending structure 28 has at least one actuator 72 associated therewith. More specifically, each actuator 72 includes a fixed pulling bracket 74 affixed to an internal side of the main body inner wall 42 i.e. the side adjacent and facing the gap 50. The fixed pulling bracket can be fixedly attached to the interior side of the inner wall 42 using any suitable fastening means, for example rivets, by welding, or any other suitable securing means. Each actuator 72 additionally includes a free pulling bracket 78 that is not affixed to the interior side of the inner wall 42, but rather is 'free floating' within the gap 50 and the cavity 70. That is, the free pulling bracket 78 is movably positioned within the gap 50 and the cavity 70 such that when the actuator 72 is activated, as described below, the free pulling bracket 78 is free to move within the gap 50 and the cavity 70 toward and/or away from the fixed pulling bracket 74.

Each actuator 72 includes at least one shape memory alloy (SMA) tendon 84 connected to and extending between the fixed and free pulling brackets 74 and 78. In a preferred embodiment, each actuator includes a plurality of the SMA tendons 84. The number of actuators 72 and SMA tendons 84 utilized per appending structure 28 is based on the particular application, e.g. a desired amount of appending structure inner skin 34 deflection and a desired amount of force generated when the SMA tendons 84 are activated, as described in detail below. In a preferred form, the SMA tendons 84 are wires or cables constructed of any suitable SMA metal, for example, a nickel-titanium alloy such as a NITINOL.RTM shape memory alloy. However, the SMA tendons 84 could have any form suitable such that when activated, i.e. heated, each SMA tendon 84 constricts in a one-dimensional direction along a longitudinal centerline, or axis, X of the respective SMA tendon 84. For example, the SMA tendons 84 could be long narrow flat strips of a SMA metal.

Figure 5A:
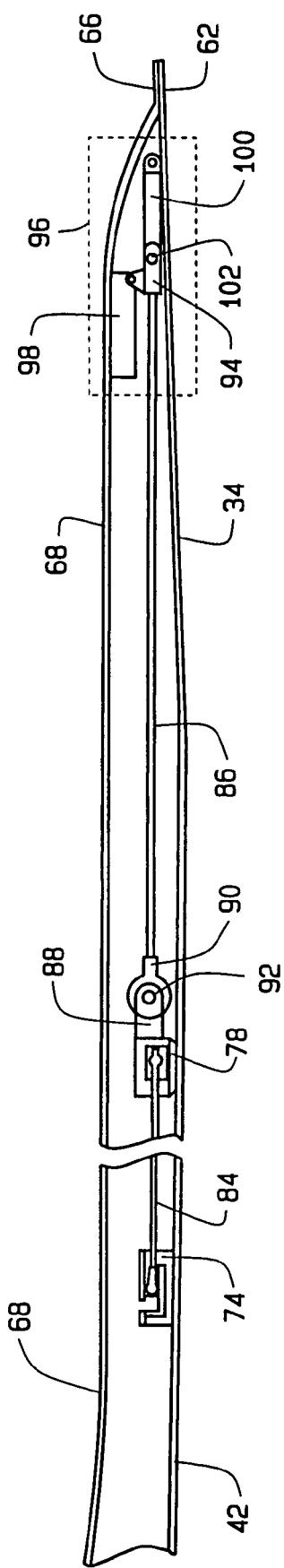
FIG. 5A is a side sectional view of the portion of a main body of the nacelle secondary nozzle shown in FIG. 2, as seen along line 5—5, illustrating an appending structure inner skin in a non-deployed state.
Figure 5B:
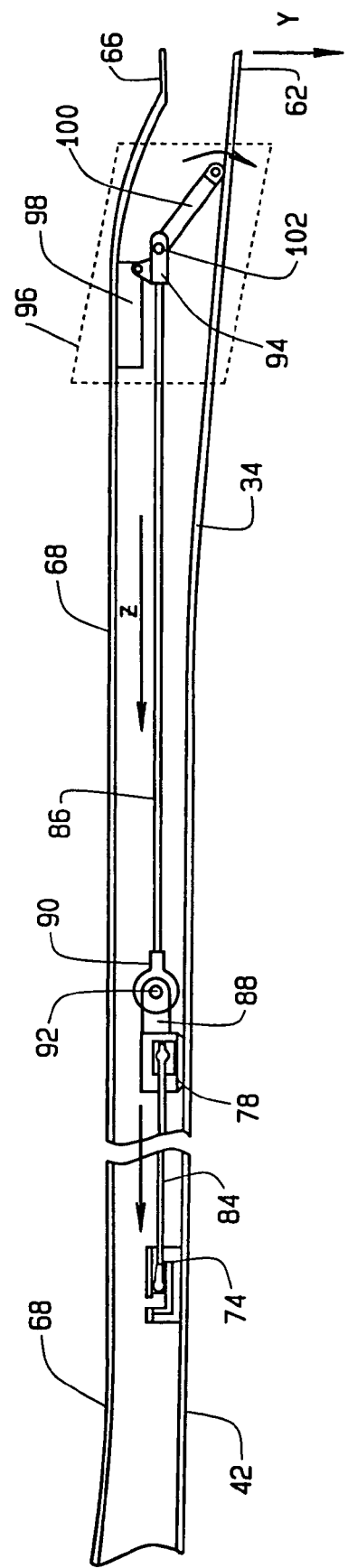
FIG. 5B, is the side sectional view shown in FIG. 5A illustrating the appending structure inner skin in a deployed state.

Referring also now to FIG. 5, each actuator 72 further includes a control arm 86 that is pivotally connected to a swivel connector 88 of the free pulling bracket 78. The control arm 86 includes an annular fitting 90 at a first end of the control arm. The annular fitting 90 is pivotally connected to the swivel connector 88 via a pivot pin 92. The control arm 86 additionally includes a linkage connector 94 pivotally connected to a deployment cam linkage 96. The deployment cam linkage 96 includes an upper plate 98 fixedly mounted to the appending structure outer skin 38, within the cavity 70, and pivotally connected to a lever plate 100 via a fulcrum pin 102. The linkage connector 94 is pivotally connected to the fulcrum pin 102. The lever plate 100 includes a roller 104, best shown in FIG. 3, rotationally connected to a distal end of the lever plate 100. When the SMA tendons 84 are not activated, i.e. not constricting as described below, the actuator 72 is in a relaxed state and the appending structure inner skin 34 is in a non-deployed position, as shown in FIG. 5A. In the non-deployed position, the lever plate 100 is essentially parallel with the inner skin 34 and the distal end portion 62 of appending structure inner skin 34 is firmly in contact with the distal end portion 66 of the appending structure outer skin 38. When the SMA tendons 84 are activated by exposure to heat, the SMA tendons constrict, as described below, to put the actuator 72 in a pulling state, whereby the appending structure inner skin 34 is moved to a deployed position, as shown in FIG. 5B. When the actuator 72 is in a pulling state, the free pulling bracket 78 is pulled toward the fixed pulling bracket 74. This in turn moves the control arm toward the fixed pulling bracket 74, in the Z direction, thereby causing the lever plate 100 to pivot about the fulcrum pin 102 and apply a force on the distal end portion 62 of the inner skin 34 in the Y direction. When the force is applied to the distal end portion 62, the roller 104 rollers along an interior surface of the inner skin 34 and thereby moves the inner skin 34 to the deployed position. In the deployed position, the distal end portion 62 of the inner skin 34 is separated from the distal end portion 66 of the outer skin 38 such that the inner skin is positioned into the exhaust flow of the secondary flow nozzle 22.

More particularly, each SMA tendon 84 is coupled at a first end 110 to the fixed pulling bracket 74 and coupled at a second end 112 to the free pulling bracket 78. As described above, each SMA tendon 84 is configured to one-dimensionally constrict along the longitudinal center line X when activated by heat. The constriction of the SMA tendon(s) 84 pulls the free pulling bracket 78 and the control arm 86 toward the fixed pulling bracket 74 in the Z direction. When pulled in the Z direction, the control arm 86 applies a force to the lever plate 100 that cause the lever plate 100 to pivot about the fulcrum pin 102. As the lever plate 100 pivots about the fulcrum pin 102, the roller 104 at the distal end of the lever plate is forced against the appending structure inner skin 34. This causes the distal end portions 62 and 66 of the appending structure lower and upper skins 34 and 38 to separate and deploys the inner skin 34. Therefore, the constriction of the SMA tendon(s) 84 causes the inner skin 34 of the appending structure 28 to move from a first position to a second position that projects, at least partially, into the exhaust flow exiting from the secondary nozzle 22. When the appending structure inner skin 34 extends into the exhaust flow, the exhaust flow is altered causing it to intermix with the ambient air flowing adjacent an external side of the secondary nozzle body outer wall 46.

In a preferred embodiment, all of the inner skins 34 of all the appending structures 26 are comprehensively controlled such that all the inner skins 34 are deployed, as described above, in a substantially simultaneously manner, at substantially the same time. Thus, when the inner skins 34 are deployed, all the inner skins 34, as a whole, change into a peripherally constricted state. Alternatively, each inner skin 34 could be independently controlled such that inner skins 34 could be coordinated to be deployed independent of each other, at different times, and/or to varying degrees of deployment. That is, some inner skins 34 could be deployed further into the exhaust flow than other inner skins 34.

The SMA tendons 84 have a predetermined length when secured between the fixed and free pulling brackets 74 and 78. When the SMA tendons 84 are not being heated, the modulus of elasticity of the appending structure inner skin 34 is greater than that of the SMA tendons 84, thus causing the SMA tendons 84 to be held taut between the fixed and free pulling brackets 74 and 78. This may also be referred to as the "martensitic" state of the SMA tendons 84 (i.e., the "cold" state). As described above, the SMA tendons 84 are activated by heat.

When the SMA tendons 84 experience heat, the modulus of elasticity of the SMA tendons 84 increases significantly, i.e., also known as its "austenitic" state. The increase in the modulus of elasticity causes the SMA tendons 84 to constrict, i.e. shorten in length, which in turn causes the appending structures inner skins 34 to deploy, i.e. bend or deform into the exhaust gas flow. In their heated condition, the modulus of elasticity of the SMA tendons 84 overcomes the modulus of elasticity of the appending structure inner skin 34, thus causing the appending structures inner skins 34 to deploy. Once the heat source is removed, the modulus of elasticity of the inner skins 34 gradually overcomes the modulus of elasticity of the SMA tendons 84 as the SMA tendons 84 cool. This effectively "pulls" the SMA tendons 84 back to their original length and returns the appending structures inner skins 34 to their non-deployed position. Thus, in a preferred embodiment, the inner skin 34 of each appending structure 28 acts as a biasing device, i.e. a 'return spring', to return each appending structure inner skin 34 to its non-deployed positions. It should be understood that the non-deployed position is when the appending structures inner skins 34 are positioned adjacent the exhaust flow path and not being deformed by the constriction of the SMA tendons 84 to extend into the exhaust flow path.

In one implementation, the appending structure inner skin 34 is constructed of a shape memory alloy such as NITINOL.RTM shape memory alloy. An advantage of utilizing a super-elastic alloy is that it is extremely corrosion resistant and ideally suited for the harsh environment experienced adjacent the exhaust gas flow. Also of significant importance is that it can accommodate the large amounts of strain required of the deformed shape.

Referring now to FIG. 4, in a preferred embodiment, the SMA tendons 84 are heated by connecting the SMA tendons 84 to a pair of electrical wires 118 that are connected to a controllable current source (not shown). To heat the SMA tendons 84 the current source is turned on such that current flows through the wires 118 to the SMA tendons 84. The electrical resistance of the SMA tendons 84 causes the SMA tendons 84 to generate heat that in turn causes the modulus of elasticity of the SMA tendons 84 to increase significantly. As described above, the increase in the modulus of elasticity causes the SMA tendons 84 to constrict, and the appending structures inner skins 34 to deploy into the exhaust gas flow. When it is desired that the inner skins 34 no longer be deployed, the current source is turned off. This allows the SMA tendons 84 to cool so that the modulus of elasticity of the appending structure inner skin 34 gradually overcomes the modulus of elasticity of the SMA tendons 84, thereby returning the appending structures inner skins 34 to their non-deployed positions.

In an alternative preferred embodiment, the SMA tendons 84 are heated using the exhaust gases from the secondary flow nozzle 22. In actual operation, the heat provided by the exhaust gases emitted from the secondary flow nozzle 22 are typically sufficient in temperature (approximately 130 degrees Fahrenheit) to produce the needed constriction of the SMA tendons 84. The actual degree of deformation may vary considerably depending upon the specific type of shape memory alloy used, as well as gauge or diameter of the SMA tendons 84. In the exemplary embodiment, wherein the structure 10 is a jet engine nacelle, when the aircraft reaches its cruising altitude, the significant drop in ambient temperature effectively acts to cool the SMA tendons 84. The cooling of the SMA tendons 84 allows the appending structures inner skins 34 to stretch the SMA tendons 84 back to their non-activated length and appending structures inner skins 34 to return to their non-deployed positions.

The fixed pulling bracket 74 includes a base 122 and a retainer 126 that fits within a reservoir 130 of the fixed pulling bracket base 122. In a preferred embodiment, the base 122 is constructed of a metal such as stainless steel. The retainer 126 is constructed of a polymer, such as acetal, to provide a layer of electrical insulation. Alternatively, the retainer 126 is constructed of a ceramic material. The first end 110 of each SMA tendon 84 is retained by the retainer 126. The first ends 110 can be retained in any suitable manner, for example the first ends 110 can be screwed, riveted, welded or otherwise bonded to the retainer 126. In a preferred embodiment, as illustrated in FIG. 5, a swaged fitting 132 is pressed onto the first end 110 of each SMA tendon 84. The swaged fittings 132 are then retained, as illustrated, within the retainer 126. Once the SMA tendons 84 are retained by the retainer 126 and the retainer 126 is placed within the reservoir 130, a cover 134 is fastened to the base 122 using fasteners 138. Preferably, the cover 134 is constructed of a polymer such as polyethylene, polypropylene or Telflon®. The fasteners 138 can be any suitable fastener such as screws, rivets or nuts and bolts.

Similarly, the free pulling bracket 78 includes a base 142 and a retainer 146 that fits within a reservoir 150 of the free pulling bracket base 142. In a preferred embodiment, the base 142 is constructed of a metal such as stainless steel. The retainer 146 is constructed of a polymer, such as acetal, to provide a layer of electrical insulation. The second end 112 of each SMA tendon 84 is retained by the retainer 146. The second ends 112 can be retained in any suitable manner, for example the second ends 112 can be screwed, riveted, welded or otherwise bonded to the retainer 146. In a preferred embodiment, as illustrated in FIG. 5, a swaged fitting 152 is pressed onto the second end 112 of each SMA tendon 84. The swaged fittings 152 are then retained, as illustrated, within the retainer 146. Once the SMA tendons 84 are retained by the retainer 146 and the retainer 146 is placed within the reservoir 150, a cover 154 is fastened to the base 142 using fasteners 158. Preferably, the cover 154 is constructed of a polymer such as polyethylene, polypropylene or Telflon®. The fasteners 158 can be any suitable fastener such as screws, rivets or nuts and bolts.

Additionally, in the embodiment wherein the SMA tendons 84 are heated utilizing an electrical current source, one of the wires 118 is connected to the first end of one SMA tendon 84 and the other wire 118 is connected to the first end of a separate SMA tendon 84 within the same actuator 72. The two SMA tendons 84 connected to the wires 118, and any other SMA tendons 84 within the same actuator 72, are electrically coupled together using jumpers 162. Therefore, current provided by the current source will travel through each SMA tendon 84 included in the actuator 72 and thereby activate each SMA tendon 84 as described above. In the case where an actuator 72 included only one SMA tendon 84, one of the wires 118 would be connected to the first end 110 of the SMA tendon 84 and the other wire 118 would be connected to the opposing second 112 of the SMA tendon 84.

Figure 6:
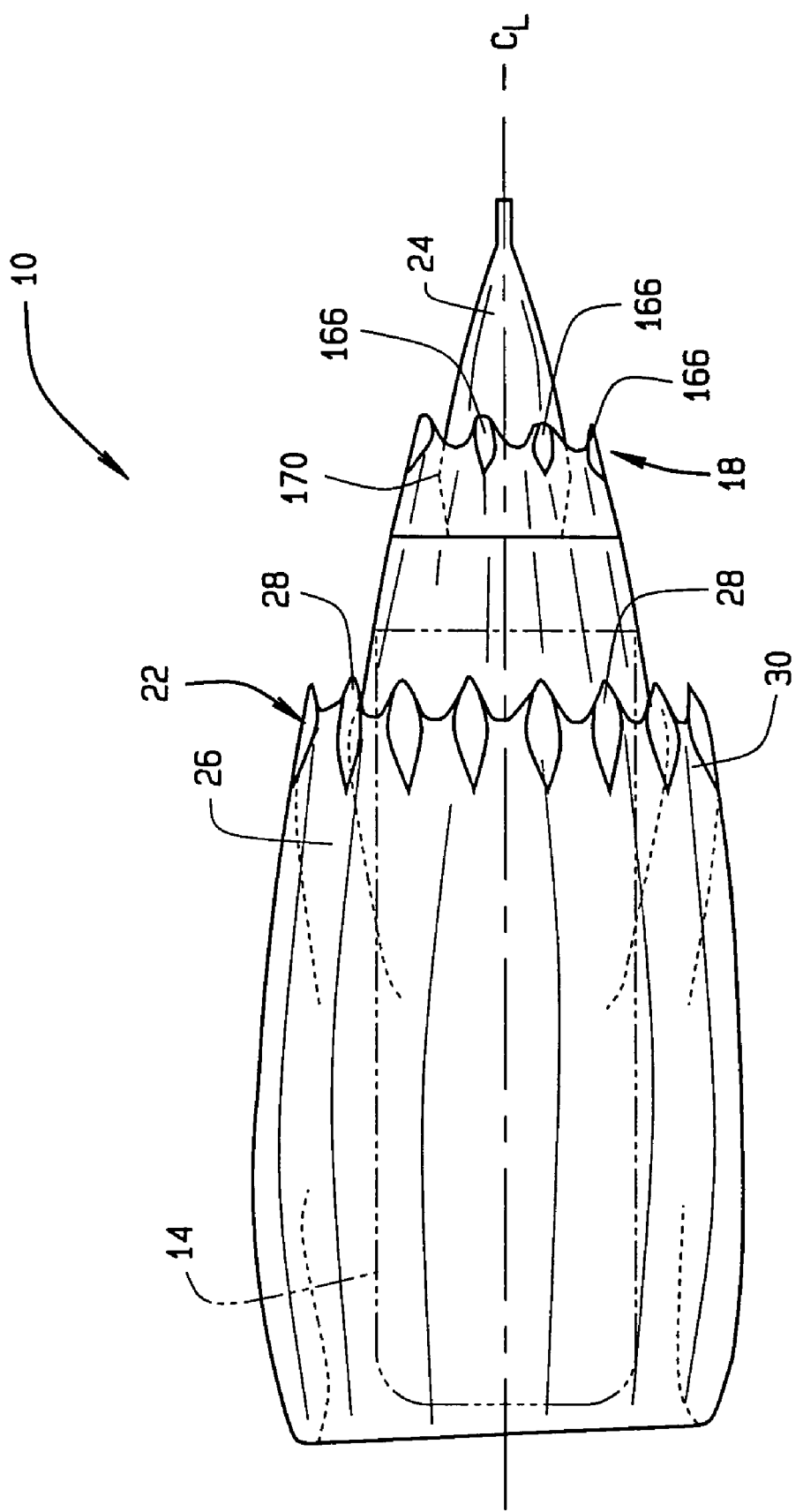
FIG. 6 is a simplified side view of the nacelle shown in FIG. 1 in accordance with another preferred embodiment of the present invention.

Referring now to FIG. 6, in further description of the exemplary embodiment wherein the structure 10 is a jet engine nacelle, another preferred embodiment will be described wherein the primary flow nozzle 18 includes a plurality of appending structures 166. The appending structures 166 extend from a lip area 170 of the primary flow nozzle 18. SMA actuators (not shown) that are substantially identical to the SMA actuators 72 described above, are attached to an inner wall of a main body of the nacelles primary nozzle 18 in the same manner as described above with reference to the nacelle secondary nozzle 22. Therefore, the appending structures 166 and associated SMA actuators, SMA tendons, control arms and deployment cam linkages (not shown) that are utilized to deploy inner skins of the appending structures 166, are essentially the same in form and function as those described above with reference to FIGS. 1–5B.

However, the inner skins of the appending structures 166 deploy to increase the mixing of core exhausts, i.e. turbine exhaust, with the ambient air and/or by-pass fan exhaust. Accordingly, the appending structures 166 are constructed of a high temperature material, such as titanium. Thus, although the above description of the present invention with respect to appending structures 28 will not be repeated with reference to appending structures 166, it should be understood that the inner skins of the appending structures 166 are deployed utilizing SMA actuators and tendons in essentially the identical manner as described above with reference to appending structures 28. Furthermore, it should be understood that FIGS. 1–5B and the related description set forth above can be used to describe the present invention with reference to both appending structures 28 and 166, with the understanding that the appending structures 166 are associated with the primary flow nozzle 18 while the appending structures 28 are associated with the secondary flow nozzle 22.

The preferred embodiments described herein thus provide a structure that includes a body having a first wall and a second wall, at least one appending structure extending from an end of the body. At least one SMA actuator is positioned between the first and second walls and within an actuator housing. The SMA actuator includes first end coupled to a portion of the body and a second end that can move within the actuator housing. At least one SMA tendon is connected to and extends between the first and second ends of the SMA actuator. The second end is also connected to a control arm that is coupled to a deployment cam linkage. The SMA tendon(s) is/are adapted to controllably constrict when activated by heat to cause an inner skin of the appending structure to move from a first position or form to a second position. Therefore, the shape or position of the appending structure inner skin is dynamically altered without complex kinematic mechanisms or the use of bulky actuators that occupy excessive space and add considerable costs and weight.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A structure comprising:
    a body including a first wall and a second wall;
    at least one appending component extending from an end of the body, the appending component including a first skin and second skin; and
    at least one actuator positioned within a cavity formed in the first wall and the second skin, the actuator comprising:
        at least one shape memory alloy (SMA) wire adapted to constrict when activated to move the first skin of the appending component from a first position to a second position,
        a fixed pulling bracket connected to a first end of the at least one SMA wire and coupled to an interior side of the first wall, between the first and second walls and within the cavity,
        a freely movable pulling bracket connected to a second end of the at least one SMA wire and located between the first and second walls and within the cavity absent direct connection to the body and the appending component such that the freely movable pulling bracket is freely movable within the cavity.

2. The structure of claim 1, wherein a proximal end of the appending component first skin is coupled to an edge portion of the first wall, a proximal end of the appending component second skin is coupled to an edge portion of the second wall, and a distal end of the first skin being in firm contact with a distal end of the second skin.

3. The structure of claim 1, wherein the actuator further comprises a control arm connected at a control arm first end to the freely movable pulling bracket and at a control arm second end to a deployment cam linkage.

4. The structure of claim 3, wherein the SMA wire is coupled at a SMA wire first end to the fixed pulling bracket and coupled at a SMA wire second end to the freely movable pulling bracket such that when the SMA wire constricts, the freely movable pulling bracket and control arm are pulled toward the fixed pulling bracket to thereby cause a lever plate of the deployment cam linkage to force the distal end of the appending component first skin to separate from the distal end of the appending component second skin and move appending component first skin from a first position to a second position.

5. The structure of claim 4, wherein the SMA wire comprises swaged fittings connected to the SMA wire first and second ends to couple the SMA wire to the fixed pulling bracket and the freely movable pulling bracket.

6. The structure of claim 1, wherein the SMA wire is activated by an increase in temperature of air flowing adjacent the body first wall and the appending component first skin.

7. The structure of claim 6, wherein the SMA wire is deactivated by a decrease in temperature of the air flow.

8. The structure of claim 1, wherein the SMA wire is activated by connecting the SMA wire to an electrical current source such that current flows through the SMA wire.

9. The structure of claim 8, wherein the SMA wire is deactivated by disconnecting the SMA wire from the electrical current source such that the current no longer flows through the SMA wire.

10. The structure of claim 8, wherein the actuator comprises a plurality of SMA wires electrically connected by jumpers such that the current flows through all the SMA wires when activated.

11. The structure of claim 1, wherein the appending component first skin acts as a biasing device to return the appending component first skin to the first position when the SMA wire is deactivated.

12. The structure of claim 1, wherein the body comprises a jet engine nacelle.

13. The structure of claim 12, wherein the appending component comprises an exhaust mixing tab adapted to intermix an exhaust from the nacelle with ambient air flowing adjacent the nacelle.

14. A jet engine adapted to controllably alter a flow of exhaust emitted from a nacelle of the engine, said engine comprising:
    a nacelle nozzle having a body including an inner wall and an outer wall;
    a plurality of flow altering structures extending from an end of the nozzle body, each flow altering structure comprising:
        an inner skin fixedly coupled at a proximal end to an edge portion of the nozzle body inner wall; and
        an outer skin fixedly coupled at a proximal end to an edge portion of the nozzle body outer wall, a distal end of the inner skin being in firm contact with a distal end of the outer skin; and
    a plurality of actuators positioned within a plurality of cavities formed in the nozzle body outer wall and the outer skins of the flow altering structures, each flow altering structure outer skin forming a first portion of one of the cavities, each flow altering structure outer skin having at least one actuator connected thereto within the respective cavity, each actuator comprising:
        a fixed pulling bracket coupled to an interior side of the nozzle body inner wall between the nozzle body inner and outer walls and within the cavity;
        a free pulling bracket located between the nozzle body inner and outer walls and within the cavity, the free pulling bracket adapted to be movable within the cavity;
        a control arm connected at a control arm first end to the free pulling bracket and at a control arm second end to a deployment cam linkage connected to the outer skin of the respective flow altering structure; and a plurality of shape memory alloy (SMA) cables coupled at a SMA cable first end to the fixed pulling bracket and coupled at a SMA cable second end to the free pulling bracket, the SMA cables adapted to one-dimensionally constrict along a longitudinal center line of each respective SMA cable when activated, the constriction pulling the free pulling bracket and the control arm toward the fixed pulling bracket to thereby cause a lever plate of the deployment cam linkage to force the distal end of the appending structure inner skin to separate from the distal end of the appending structure outer skin and move appending structure inner skin from a first position to a second position.

15. The engine of claim 14, wherein each SMA cable comprises swaged fittings at the SMA cable first and second ends to couple each SMA cable the respective fixed pulling bracket and the free pulling bracket.

16. The engine of claim 14, wherein each SMA cable is electrically connected to an electrical current source whereby each SMA cable is activated by turning on the electrical current source such that current flows through the SMA cables.

17. The engine of claim 14, wherein the inner skin of each flow altering structure is adapted to act as a biasing component to return the flow altering structure inner skin to the first position when the SMA cables are deactivated.

* * * * *